Patented May 13, 1930

1,758,572

UNITED STATES PATENT OFFICE

FRIEDRICH LIERG, OF VIENNA, AUSTRIA

PROCESS OF PRODUCING PICTURES CONSISTING OF DYES IN PHOTOGRAPHIC MANNER

No Drawing. Application filed August 15, 1928, Serial No. 299,880, and in Austria October 18, 1927.

This invention relates to a process of producing pictures consisting of dyes in photographic manner.

It is already known to produce the impression of pictures by exposure, which during the subsequent treatment in baths are colour-synthetically developed to the proper colour-picture. Further it has already been proposed to produce colour-pictures in the gelatine on top of the silver-image, so that this mode of producing colour-pictures would be of very great importance in the case of photography and particularly in the case of colour-photography. However all these proposals and experiments met with insurmountable difficulties, so that they did not lead to any practical result. Contrary to this, the processes first mentioned, based on the destruction or generation of components forming pigments directly by light, has been found of practical use and is known by the name "Diazotype". However in view of the direct decomposition by the light, these processes are limited to certain groups of dyes or colours and thus the tone of colour which can be attained is very limited, so that they are of value for copying processes, but do not in any way satisfy the requirement demanded by the colour photography from partial colour pictures as far as the fixing in the gelatine is concerned with a thorough transparency of the colours and accuracy of the attained tones of colour. The dyes for use in connection with colour photography have to be of such a character, that only very few dyes possess the correct spectral qualification and therefore it cannot be expected that the same can be satisfied by synthesized dyes.

The fundamental idea of the present invention is to start from such dyes that have proven their spectral value in connection with colour photography and which impart to the process the property or character demanded by the colour-synthetic development of colour-pictures in the gelatine, and further shows new ways by which colour-pictures can be directly or indirectly produced on silver. At the same time, the particular chemical pre-treatment of the dye-components renders possible that very large, hitherto unsuited groups of the most valuable dyes can be used colour-synthetically in connection with colour-photography.

The fundamental conditions which have to be satisfied by the dyes are, besides a quick and easy synthetic production (for instance by oxidation, combination by oxidation or combination by diazotization), the unassailability or insolubility of the dye-components in the photographic baths; further the indifference with respect to the sensitive silver-emulsion and the immediate fixing of the dye in the moment of production. Therefore the insoluble dyes do not possess the necessary characters because the insolubility of the dye is not necessarily connected with the insolubility of its components and with the indifference as far as the silver-emulsion is concerned, and these so-called "pigment-dyes" usual lead to powdery and accordingly nontransparent colour-pictures such as is the case with mineral colours. The methods of fixing colours as used in the dyer's trade can be utilized in connection with photography to a very limited extent only, because the usual binding of the basic dyes or colours by means of tannic acid and emetic tartar during the washing of the gelatine with water for some time is not sufficient and the possibility of fixing the acidified colours or dyes is limited to a few varnishes. Therefore, up to now, the azo dyes, which contain the most brilliant colours and mainly are acidified dyes, are practically not used in connection with colour-photography.

In the process according to the present invention the colour-components are already transformed into water-insoluble although possibly alcohol-soluble members and as such are embodied into the gelatine or the like or into the silver-emulsion. Thus there is a guarantee, that these components are not changed in any way by the photographic baths, which are necessary until the actual colour-synthesis is reached, and that they do not in any way detrimentally influence the silver-emulsion, because insoluble, neutral and quite indifferent bodies are formed.

For this reason, urates, sebates or rosin acid or other insoluble salts are formed out of the basic dye or colour components and insoluble metal combinations are formed from the naphtols and their analogues, while the acidous components and more particularly the sulpho-acid components of the azo dyes, all of which are not precipitable, are transformed into insoluble bodies by producing their esters, anilides or the like. During the diazotization, insoluble colours or dyes of perfect transparency are produced, because all these bodies can be embodied in the gelatine in a finely dispersed condition by means of alcohol or similar solvents able to mix in water. It has been found, that the insolubility of the components is no obstacle to a ready combination and that during the diazotization the insoluble diazo-components are immediately disintegrated, while the azo component rendered insoluble or esterified is readily combined and, in view of the insolubility, yields an insoluble azo dye.

In spite of their insolubility, the dye-components produced as above described, when dry become as clear as glass on the gelatine under certain conditions and with constitutional qualification.

By making use of this feature, on account of the above described dye-components being rendered insoluble, a colour or dye picture can be produced in the reverse order in a simple manner with the aid of silver, thus from a silver-positive a dye-negative can be obtained. The silver-emulsion, which already contains the dye-components in exact doses, is now developed, and fixed and subsequently the silver-image is placed into a bleaching bath, which at the same time is subjected to a tanning action thus hardening the gelatine at the image-places. Such baths are not unknown which are able to harden the gelatine at the silver-places in such a manner (as for instance the light in the case of chrome gelatine), that at these places solvents are completely repelled, and these baths are already in use for instance in the technicolor process. On immersing an image thus hardened in a bath, the dyes can form only at the unhardened places, so that a dye-image is formed in the reverse order of the silver image. This bath releases the colour synthesis or combination of the components with respect to the dyes, this being accomplished in this case by oxidation, diazotization or the like. According to the present invention such a reversed dye-image can be obtained also if besides insoluble disazo and azo components also a water insoluble member is added to the silver-emulsion, which can develop nitrous acid by means of acids, acidous vapours or by any other means. There is not a large number of such members, because all metal nitrites possess a certain degree of solubility but they can be found in corresponding insolubility among the complicated cobalt combinations.

Among others the double salts of luteo-cobalt-chloride with diamin-cobalt-nitrite

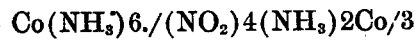

or with cobalt-nitrite

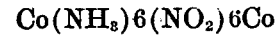

are suited for this purpose, when the former salt may again be readily removed from the gelatine by $NH_4NO_3$ solution. After exposure the prepared gelatine-silver emulsion is neutrally developed and fixed and subsequently the nitrite combination is oxidely destroyed at the places of the silver-image by neutral salts. Such oxidations, which are rendered operative solely at the places of the silver by means of neutral not oxidable combinations, are known according to Luther and Holleben (German Patent No. 396,485 dated May 8, 1923), under the term of coupled oxidation procedures. At the places which are clear of silver, the nitrite combination is not changed or affected and therefore the azo dye image can be produced by the same and a dye image produced in the reverse order of the silver image.

The diazotization of the disazo and azo components, rendered insoluble, can however also be obtained directly, by means of silver in transforming the developed silver-image into an insoluble nitrite-combination. According to the present invention such a transformation of the silver into an insoluble nitrite-combination is carried out very quickly in the following manner, by means of completely neutral solutions. The silver image is transformed in known manner into a silver ferrocyanide image by means of potassium ferricyanide and the same is washed in luteo-cobalt-chloride solution after a thorough washing. In the same manner the ferrocyanide silver is immediately converted into a yellow insoluble luteo ferrocyanide combination which, on being washed in tetranitrito diamin cobalt acidulous ammonium or cobalt-nitrite, is converted with the same into the above insoluble luteo-double salts. Instead of making use of the organic luteo combination it is also possible to use inorganic combinations, for instance thallium salts, for a similar conversion of the silver into insoluble nitrite combinations. For instance thallichloride with silver, similar to the known mercury bleaching process, is converted into insoluble thallichloride, which combines with sodiumcobaltnitrite to water-insoluble thallous cobaltnitrite. A similar conversion is rendered possible also in the case of thallous ferrocyanide.

Instead of converting the reduced silver into insoluble nitrite combinations, also an insoluble nitrite combination (for instance, thallous cobaltinitrite) can be added to the emulsion already at the beginning, which subsequently is destroyed by oxidation at the places of the reduced silver, so that a diazotization cannot take place at these places, whereby a dye-image of the reversed order of the silver-image is obtained.

In order that in photographic processes the chemical effect of the water-insoluble nitrite combinations should not be taken into consideration, the same may be formed in the gelatine after the development of the silver-image. For instance this is carried out, either before or after the bathing or washing, by incorporating luteoferrocynide into the gelatine, and its conversion into insoluble luteocobaltinitrite is carried out by washing in a sodium-cobaltinitrite solution.

In the manner of these double conversions by the use of silver, there are still other ways to convert silver-images into insoluble nitrite-images, which still come within the scope of the present invention.

When starting the diazotization in any convenient manner at the places of this nitrite-image, an azo dye image is formed at the places of the previous silver-image.

Besides the production of monochromic pictures or images also photographs in natural colours can be produced in different manner. Especially at a single exposure, without any transformation, a picture in natural colours can be obtained directly.

For this purpose for instance three emulsions, rendered sensitive for the own base colours, are cast on top of each other in three layers, each of the said emulsions containing the particular dye-components, which yield the dye complementary to the sensitive region. Now during the production of the picture the corresponding monochromic partial picture is produced in each layer, which in superposition result in a picture in natural colours. The process is particularly rendered possible in that the colour-synthesis can be effected in all three layers by a uniform dissolution bath (for instance acidified alum).

I claim:—

1. Process of producing pictures consisting of dyes in photographic manner, which consists in embodying in the base the dye-components (necessary for forming the colours) in a water-insoluble condition which is indifferent with respect to the silver-emulsion, and after producing the silver-image developing on top of the same the dye-image out of the said components.

2. Process of producing pictures consisting of dyes in photographic manner, which consists in embodying in the base the components of the azo dyes (necessary for forming the colours) in a water-insoluble condition which is indifferent with respect to the silver-emulsion, and after producing the silver-image developing on top of the same the dye-image out of the said components.

3. Process as claimed in claim 1, which further consists in producing the dye-image by completely hardening the base at the places of the silver-image, and subsequently effecting the colour-synthesis out of the components at the unhardened places of the base, so that a dye-image in the reverse order of the silver-image is obtained.

4. Process as claimed in claim 2, which further consists in producing the dye-image by completely hardening the base at the places of the silver-image, and subsequently effecting the colour-synthesis out of the components at the unhardened places of the base, so that a dye-image in the reverse order of the silver-image is obtained.

5. Process as claimed in claim 1, which further consists in adding to the silver-emulsion besides the dye-components a water-insoluble nitrite combination and destroying the same at the places of the produced silver-image, so that the diazotization for the dye-image can take place only at the places of the not destroyed nitrite combination and at the places of the base which are free of silver.

6. Process as claimed in claim 2, which further consists in adding to the silver-emulsion besides the dye-components a water-insoluble nitrite combination and destroying the same at the places of the produced silver-image, so that the diazotization for the dye-image can take place only at the places of the not destroyed nitrite combination and at the places of the base which are free of silver.

7. Process as claimed in claim 1, which further consists in subsequently converting by means of baths a water-insoluble nitrite combination after the treatment of the silver-emulsion for the purpose specified.

8. Process as claimed in claim 2, which further consists in subsequently converting by means of baths a water-insoluble nitrite combination after the treatment of the silver-emulsion for the purpose specified.

9. Process of producing pictures consisting of dyes in photographic manner, which consists in embodying in the base the dye-components (necessary for forming the colours) in a water-insoluble condition which is indifferent with respect to the silver-emulsion, and after producing the silver-image developing on top of the same the dye-image out of the said components, the silver-image itself being converted into an insoluble nitrite combination, causing by chemical action the diazotization and producing a dye-image in place of the former silver-image.

10. Process of producing pictures consisting of dyes in photographic manner, which consists in embodying in the base the components of the azo dyes (necessary for forming the colours) in a water-insoluble condition which is indifferent with respect to the silver-emulsion, and after producing the silver-image developing on top of the same the dye-image out of the said components, the silver-image itself being converted into an insoluble nitrite combination, causing by chemical action the diazotization and producing a dye-image in place of the former silver-image.

11. Process as claimed in claim 9, which further consists in converting the silver into a complex insoluble ferrocyanide combination by the ferricyanide process, the said combination already containing nitrite-groups.

12. Process as claimed in claim 10, which further consists in converting the silver into a complex insoluble ferrocyanide combination by the ferricyanide process, the said combination already containing nitrite-groups.

13. Process as claimed in claim 9, which further consists in converting the silver into a complex insoluble ferrocyanide combination by the ferricyanide process, the said combination together with a nitrate combination forming insoluble nitritous double salts.

14. Process as claimed in claim 10, which further consists in converting the silver into a complex insoluble ferrocyanide combination by the ferricyanide process, the said combination together with a nitrite combination forming insoluble nitritous double salts.

In testimony whereof I affix my signature.

FRIEDRICH LIERG.